United States Patent [19]

Winfield

[11] E Patent Number: Re. 32,693

[45] Reissued Date of Patent: Jun. 14, 1988

[54] SAFETY LINER FOR TIRES

[75] Inventor: Mason C. Winfield, Orchard Park, N.Y.

[73] Assignee: Astronics Corporation, Orchard Park, N.Y.

[21] Appl. No.: 527,410

[22] Filed: Aug. 29, 1983

Related U.S. Patent Documents

Reissue of:

[64] Patent No.: 4,393,911
Issued: Jul. 19, 1983
Appl. No.: 401,938
Filed: Jul. 26, 1982

[51] Int. Cl.[4] ..... B60C 17/00

[52] U.S. Cl. ..... 152/158; 24/483; 152/520; 403/344

[58] Field of Search ..... 152/158, 330 RF, 330 L, 152/379.5, 386, 395, 399; 403/344; 24/607, 635, 694, 704

[56] References Cited

U.S. PATENT DOCUMENTS

| | | | |
|---|---|---|---|
| Re. 28,196 | 10/1974 | Patecell | 152/158 |
| 1,044,055 | 11/1912 | Johnson et al. | 403/107 |
| 2,040,645 | 5/1936 | Dickinson | 152/158 |
| 2,999,267 | 9/1961 | Sterling et al. | 16/105 |
| 3,049,162 | 8/1962 | Rosenbaum et al. | 152/158 |
| 3,237,667 | 3/1966 | Lindley | 152/158 |
| 3,394,749 | 7/1968 | Lindley | 152/158 |
| 3,420,288 | 1/1969 | Unruh | 152/158 |
| 3,635,273 | 1/1972 | Patecell | 152/158 |
| 3,976,114 | 8/1976 | Patecell | 152/158 |
| 4,173,243 | 11/1979 | Wilde et al. | 152/158 |
| 4,270,592 | 6/1981 | Patecell | 152/158 |
| 4,401,144 | 8/1983 | Wilde | 152/158 |

FOREIGN PATENT DOCUMENTS 1522028 8/1978 United Kingdom .

*Primary Examiner*—Donald E. Czaja
*Assistant Examiner*—Ramon R. Hoch
*Attorney, Agent, or Firm*—Shlesinger Fitzsimmons Shlesinger

[57] ABSTRACT

The liner includes a generally C-shaped, flexible band of bearing material disposed to be placed around the [drop] center *section* of a tire rim. [Two, complimentary, generally semi-circular] *A plurality of arcuate* members made from a polyester elastomer are then mounted as a ring coaxially around the outside of the band with the inner peripheral surfaces thereof slidably seated in a circumferential groove that is formed in the outer periphery of the band. The confronting ends of the members are releasably secured together by a pair of rigid links, each of which is releasably and pivotally mounted at one end in a recess in one end of a member, and has its opposite end connected to a rotatable eccentric that is mounted in the confronting end of the other member. When the associated eccentric is rotated, it causes the attached link to be reciprocated further into, or out of, the end of the associated member, thereby causing the link selectively to shift confronting ends of the members toward or away from each other. In one embodiment the C-shaped band is a one-piece element, while in another a layer of metal (for example galvanized steel) is mounted in the outer groove of the band to be interposed between the band and the ring members.

REEXAMINATION RESULTS

The questions raised in reexamination request No. 90/000,540, filed 04/09/84, have been considered and the results thereof are reflected in this reissue patent which constitutes the reexamination certificate required by 35 U.S.C. 307 as provided in 37 CFR 1.570(e).

11 Claims, 2 Drawing Sheets

SAFETY LINER FOR TIRES

Matter enclosed in heavy brackets [ ] appears in the original patent but forms no part of this reissue specification; matter printed in italics indicates the additions made by reissue.

BACKGROUND OF THE INVENTION

This invention relates to rigid tire liners, which are releaseably attached to the tire rims of automotive vehicles and the like to permit continued operation of a vehicle when one or more of its pneumatic tires fail or become flat; and more particularly this invention relates to two-piece safety tire liners having improved means for releaseably attaching the two cooperating sections thereof together.

In recent years worldwide terrorist activities have considerably heightened interest in securing for automotive tires some form of safety liner, which would permit continued operation a vehicle's wheel whenever the associated tire happened to fail and become flat. This problem is particularly acute in connection with modern-day tubeless tires, which have beaded edges that must remain in engagement with corresponding flanges on the associated tire rim in order to prevent leakage of air from the tire.

Regardless of the nature of the tire employed, several efforts have been made to provide a satisfactory safety tire liner. U.S. Pat. No. 2,040,645, for example, discloses the desirability of employing a two-piece liner of circular configuration, which is adapted to rotate relative to the rim upon tire failure. The two sections of the liner are circular in configuration, with each having a radial slot or opening to permit each circular section to be spread or forced open for the purpose of mounting the liner on a rim. U.S. Pat. No. 3,049,162 also teaches the desirability of employing a circular safety liner mountable on the outer periphery of a tire rim to be located relative thereto when the associated tire became flat, but this type of safety device requires a very special tire rim.

U.S. Pat. No. 3,420,288 also suggests using a two two-piece tire liner each of which sections is semi-circular in configuration, and which are attachable around the outside of a tire rim by releasable coupling means. This liner, however, was designed to be secured to the rim so that it could not rotate relative to the rim upon tire failure.

There are also a series of U.S. Pat. No. Re 28,196; U.S. Pat. No. 3,976,114 and U.S. Pat. No. 4,270,592 which also disclose two-piece safety liners which are disposed to rotate on a tire rim upon tire failure, but such liners utilize coupling means which are difficult to manufacture and manipulate, and also do not protect against bead failure during use.

It is an object of this invention, therefore, to provide an improved safety liner of the type described which is relatively inexpensive to manufacture and easier to operate than prior such liners.

A further object of this invention is to provide an improved safety liner which is formed in two, arcuate, generally semi-circular sections, the confronting ends of which are readily attached to and detached from each other by a novel eccentric-type coupling means.

Another object of this invention is to provide an improved, two-piece safety liner of the type described which is particularly designed for use with a novel bead lock ring, which is interposed between the safety liner and the associated tire rim rotatably to support the liner in a predetermined axial position on the rim.

Other objects of the invention will be apparent hereinafter from the specification and from the recital of the appended claims, particularly when read in conjunction with the accompanying drawings.

SUMMARY OF THE INVENTION

In one embodiment of the invention a special bead lock ring or liner of generally C-shaped configuration is attached snugly around the outer peripheral surface of an automotive tire rim of a vehicle of the commercial or military variety. Secured in a groove in the outer surface of this ring is a generally C-shaped bearing member, which may be made from, for example, galvanized steel. Secured snugly and coaxially around the outside of the bearing member is a novel safety liner comprising two, rigid, semi-circular segments the confronting ends of which are releasably attached or coupled together by a pair of eccentric locking mechanisms. Each mechanism comprises a metal link releasably and pivotally secured at one end by a screw on one of two confronting ends of the liner segments, and rotatably attached at its opposite end to an eccentric, which is mounted in the other confronting end of the segments for rotation about an axis parallel to the screw axis.

The safety ring is dismantled by removing the two bolts so that one end of each link can be withdrawn from the adjacent liner section. To assemble the two sections they are placed around the drop center of a rim and the two links are reinserted in registering openings in the confronting ends of the adjacent liner sections, and are releasably secured in place by the two bolts. Then, to adjust the two sections to draw them together, snugly around the outside of the associated tire rim, the two eccentrics, which are mounted in the other ends of the links, are rotated slightly to cause the confronting ends of the two liner sections to be drawn snugly together.

In a second embodiment a modified bead lock ring is employed for use in connection with a conventional rim of the type which is employed on most non-commercial automotive vehicles. In this embodiment the two, semi-circular sections of the associated safety liner are releasably coupled together by the same types of eccentric mechanisms referred to above. In the second embodiment, however the safety liner is mounted directly on the bead lock ring.

THE DRAWINGS

DETAILED DESCRIPTION OF THE PREFERRED EMBODIMENTS

Figure 1:
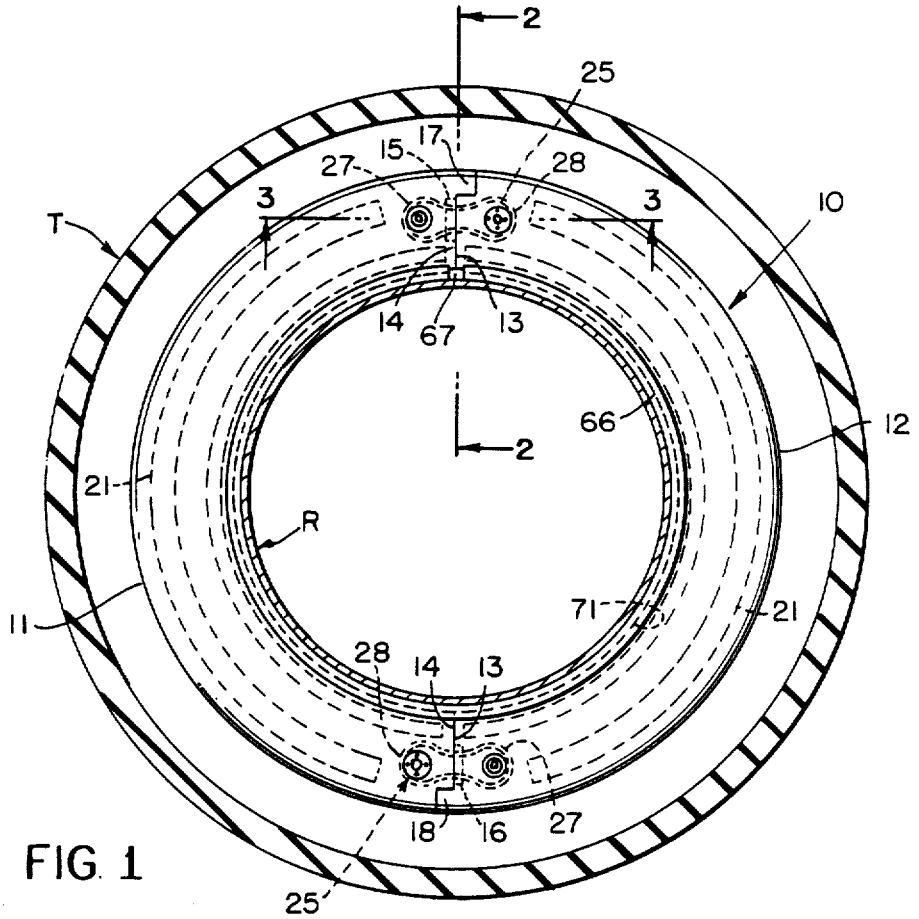
FIG. 1 is a side elevational view of an inflatable automotive tire mounted on a conventional rim which has thereon a safety ring made according to one embodiment of this invention, portions of the tire and rim being cut away and shown in section.

Referring now to the drawings by numerals of reference and first to FIGS. 1 to 3, 10 denotes generally a novel safety liner comprising two, rigid, cooperating, semicircular sections 11 and 12, which are molded from a plastic material, such as for example a polyester elastomer of the type sold by E. I. du Pont de Nemours & Co., Inc. under the trademark "Hytrel". [Section] *Sections* 11 and 12 have at opposite ends thereof flat, coplanar end surfaces 13 and 14, respectively, which are disposed to be placed in substantially coplanar engagement when the ring 10 is mounted in an operative position on a tire rim R as shown for example in FIG. 1. In this position an integral tongue or lug 15, which projects centrally from one of the end faces 14 of section 12 (the upper end face 14 FIG. 1) seats slidably in a cooperating recess 15' (FIG. 3) formed in the confronting end surface 13 on section 11, while a similar lug 16 (FIG. 1) projects from one of the end faces 13 (the lower end face 13 in FIG. 1) into a cooperating recess formed in the confronting end surface 14. In addition, one of the end surfaces 13 (the upper in FIG. 1) and one of the end surfaces 14 (the lower in FIG. 1) has thereon adjacent the outer peripheral surface of the associated liner section an integral flange portion 17 and 18, respectively, which is disposed to seat in a cooperating notch or recess formed in the confronting end surface of the adjacent liner section 11 or 12. In this way the end surfaces 13 and 14 have tongue and groove connections which tend to prevent any lateral movement of the sections 11 and 12 relative to each other when they are in their assembled positions as shown in FIG. 1.

Figure 2:
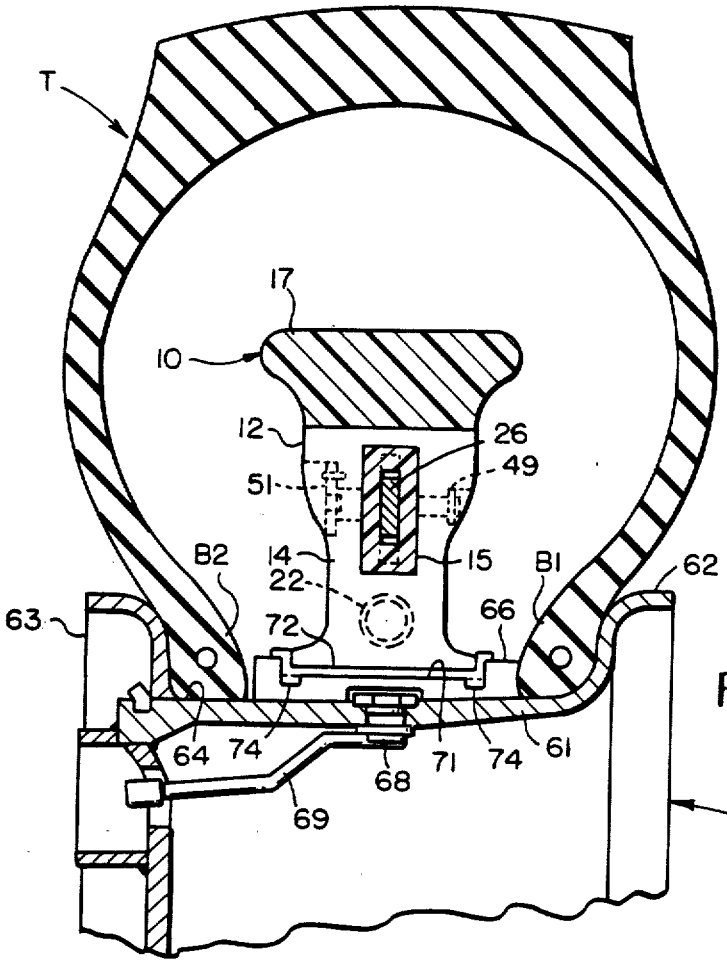
FIG. 2 is an enlarged, fragmentary sectional view taken generally along the line 2—2 in FIG. 1 looking in the direction of the arrows.

Molded within each liner section 11 and 12 adjacent its outer peripheral surface is an elongate, arcuate reinforcing tube 21 (FIG. 1), opposite ends of which terminate at points spaced inwardly from the associated end surfaces 13 and 14. Also embedded in each section 11 and 12 adjacent its inner peripheral surface is an additional, arcuate reinforcing tube 22, only one of which is shown in FIG. 2. These tubes 21 and 22 add considerable radial compressive strength to the ring 10 when it is assembled as shown in FIG. 1. These tubes 21 and 22 may be made, for example, from a metal such as aluminum, and each has a diameter and thickness depending upon the overall dimensions of the ring 10.

The two liner segments or sections 11 and 12 are adapted to be releasably attached together by a pair of eccentric coupling mechanisms, which are denoted generally by the numeral 25. Since these two mechanisms are similar, only one (the upper one as shown in FIG. 1) will be described in detail herein.

Figure 3:
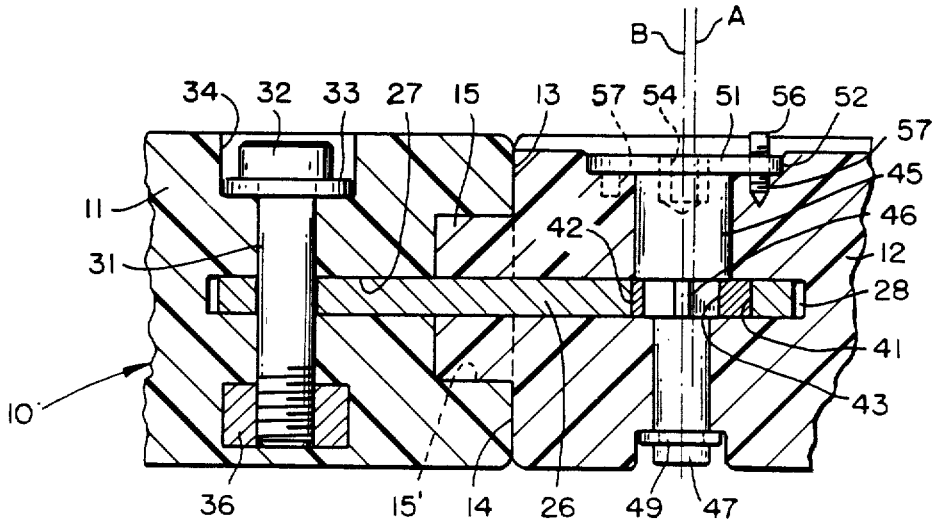
FIG. 3 is a greatly enlarged, fragmentary sectional view taken along the line 3—3 in FIG. 1 looking in the direction of the arrows.

Referring to mechanism 25 as shown at the top of FIG. 1, and in section in FIGS. 2 and 3, 26 denotes a flat, metal link, which is nearly in the shape of a numeral "8". In its operative position opposite ends of link 26 project slidably into similarly shaped notches or recesses 27 and 28, which are formed centrally in the confronting end surfaces of sections 11 and 12, respectively. Adjacent one end (its left end in FIGS. 1 and 3) link 26 is mounted to pivot about the shank of a bolt 31 (FIG. 3) the head 32 of which is seated against a washer 33 that is positioned in a circular recess or counterbore 34 formed in one side of section 11. The opposite end of bolt 31 is threaded into a stationary nut 36, which is embedded in section 11 adjacent the opposite side thereof.

Mounted to rotate in a circular opening 41 (FIG. 3) in the opposite end of link 26 is an eccentric bushing 42, which has therethrough a rectangularly shaped opening 43 the center line of which is radially offset slightly from the center line of bushing 42 and opening 41. Rotatably mounted in an opening that extends transversely through section 12 coaxially of the opening 43 in bushing 42 is an adjusting nut or pin 45, which has intermediate its ends a rectangularly shaped skirt portion 46 that fits slidably and operatively within the rectangular opening 43 in bushing 42. Nut 45 has at one end a reduced-diameter shank 47, which is secured against removal from section 12 by a resilient C-ring or lock ring 49.

Integral with or otherwise secured to the opposite ends of pin 45 (the upper end in FIG. 3) is an enlarged-diameter index plate 51, which is seated in a circular recess 52 in the side of section 12 remote from the lock ring 49. Extending through the center of plate 51 and part way into pin 45 coaxially thereof is an Allen wrench socket or recess 54, which is hexagonally shaped in cross section. Adjacent its outer peripheral edge plate 51 has therethrough a tapped, circular opening in which is releasably threaded a locking screw 56, the shank of which extends through plate 51 and into one of a plurality of registering openings 57 formed in the section 12 beneath plate 51 to secure the latter against rotation as noted hereinafter.

The other coupling mechanism 25 shown at the bottom of FIG. 1 is similar in construction and operation to the above-described mechanism 25, except that its removable end—i.e., the end secured by bolt 31—is located in section 12, while its eccentrically mounted end is located in section 11. In either case, the narrowest portion of a pair of cooperating recesses 27 and 28 is just wider than either end of a respective link 26, so that when the bolts 31 are removed, the two sections 11 and 12 can be completely separated from each other.

On the other hand, when the bolts 31 are in place as shown in the drawings, each pair of adjacent ends of the sections 11 and 12 can be shifted slightly toward and away from each other merely by rotating the associated index plate 51. For example, in FIG. 3 the respective centerlines of the circular bushing 42 and of the indexing pin 45 are denoted at A and B, respectively. If pin 45 is rotated 180° from its illustrated position it will cause a similar rotation of the bushing 42 so that its centerline A will be rotated to a position to the left of the pin centerline B as viewed in FIG. 3, and in doing so will shift link 26 and hence section 11 toward the left relative to section 12, thereby to separate the two confronting ends of the sections 11 and 12. When the other mechanism 25 is similarly adjusted the two sections 11 and 12 will be spaced from each other a distance equal to the eccentricity of bushings [45] *42* thus disengaging liner 10 from its gripping engagement with the bearing 72.

Ring 10 is particularly suited for use in connection with a commercial or military-type rim R (FIG. 2) which has a [centr] *center* section 61 bound at one side by an integral circumferential flange 62, and at its opposite side by a removable flange 63. Mounted on the rim between flanges 62 and 63 is a conventional, tubeless tire T having the usual, spaced, circumferential beads B1 and B2, the outer marginal edges of which are seated against the confronting surfaces of the flanges 62 and 63, respectively. Releasably secured to and surrounding the outer peripheral surface 64 of the [drop] center

*section* 61 between the beads B1 and B2 is a flexible, generally C-shaped bead lock ring 66, opposite ends of which register with each other at opposite sides of a narrow space 67 (FIG. 1), which is formed between the confronting ends of the ring to register with the inner end 68 of a conventional [value] *valve* stem 69.

Ring 66 has in its outer periphery a central, circumferential recess 71, which is lined with a thin layer 72 of galvanized steel, or a similar material capable of forming for the liner 10 a sliding bearing surface. As shown more clearly in FIG. 2, recess 71 and layer 72 are generally U-shaped in cross section; and a pair of spaced tabs or projections 74 at each end of layer 72 are bent downwardly over the adjacent ends of the ring 66 to secure layer 72 firmly thereon. The liner 10 is secured by its coupling mechanisms 25 coaxially and snugly around the outside of ring 66, and with its inner peripheral surface engaging the bearing layer 72 except when the tire T happens to fail, and the associated wheel is run with the tire in its flattened condition. In such case the inner peripheral surface of the tire T will engage the outer periphery of liner 10 and cause it to rotate on the bearing layer 72 in unison with the tire T. This prevents any relative rotation as between the liner 10 and the tire T, thus permitting the flattened tire to continue to operate in an almost normal manner for a prolonged period of time after its failure.

To mount the tire and liner 10 on the rim R, and assuming that the bolts 31 and rim flange 63 have been removed, the bead B1 of the tire is inserted over the [drop] center *section* 64 and slid part way toward flange 62 so that part of the surface [64] *61* extends part way coaxially into the tire. The ring 66 is then slid onto the portion of the rim that extends into the tire, and the liner sections 11 and 12 are placed around the outside of the bearing layer 72 of ring 66. The bolts 31 are then threaded into mechanisms 25 to secure the section ends by the links 26; and the index plates 51 are rotated by an Allan wrench to draw the ends of sections 11 and 12 together, so that liner 10 fits snugly on the ring 66 and around its bearing layer 72. The lock screws 56 can then be threaded into registering recesses in the liner 10 to prevent any further rotation of the index plates 51. This assembly is then forced axially onto the [drop] center [64] *section 61* until bead B1 engages flange 62, after which flange 63 can be secured to the rim to complete the assembly as shown in FIGS. 1 and 2.

The gap or space 67 (FIG. 1) between the ends of ring 66 is made to register with the inner end 68 of valve 69 so that air can be supplied to the inside of tire T after its assembly on the rim.

In order to remove liner 10 from the rim, and assuming that the tire T has been deflated, the flange 63 is removed, and the tire T together with the associated liner 66 and ring 10 are shifted or slid axially toward the left in FIG. 2 relative to the rim until the liner 10 becomes accessible, after which the above-noted procedure is performed in reverse to separate the liner sections 11 and 12 and permit removal thereof from the tire.

From the foregoing it will be apparent that the present invention provides an extremely sturdy safety liner which can be readily assembled and disassembled from a vehicle rim of the type described with relative ease, and with a minimal amount of tools. The two sections 11 and 12 can be assembled merely by the use of an Allen wrench, assuming that the lock screws 56 have enlarged or winged heads to enable manual insertion thereof into and out of the associated indexing plate 51 without the use of a screwdriver or the like. Moreover, although the recesses 54 in the indexing plates 51 are designed for operation by an Allen wrench, it will be obvious that any conventional means for rotating the plates 51 and the associated pins 45 could be employed without departing from this invention. When the two sections 11 and 12 are urged toward each other around the liner 66 during assembly, the projecting ends of the links 26 are readily guided into the associated recesses 27 by virtue of the fact that the ends of the links are rounded, and thus automatically center themselves in the associated recesses. Still another advantage of this construction is that there are no loose pieces to be lost or misplaced when the liner 10 is not in use, except perhaps for the bolts 31 and pins 56, which are extremely conventional and are readily replaceable.

Still another feature of this invention is that the bead lock ring 66 forms the dual function of retaining the liner 10 in a predetermined axial position relative to the associated rim R, while at the same time preventing any undesirable disengagement of the beads B1 and B2 from the associated rim flanges 62 and 63 during operation of the tire T in its flattened condition, as for example, when the tire is engaged with the outer peripheral surface of the liner 10. Under those circumstances the beads B1 and B2 will be firmly retained between the opposed side edges of liner 66 and the flanges 62 and 63, respectively. This permits the associated wheel to continue operation for prolonged periods of time even though the tire T happens to be flat. Also, during such flattened operation of the tire the liner 10 will be caused to rotate on the bearing surface 72 relative to rim R and the liner 66, thereby obviating the need for the liner to [64] rotate directly on the [drop] center [64] *section 61*. The advantage of this is that it permits the manufacture of the relatively inexpensive rings 66 to suit differently sized rims R, but permits the manufacture of the more complicated liner sections 11 and 12 in standard or uniform widths. This construction also permits the bearing layer 72 to be designed to provide the most suitable bearing surface for the liner sections 11 and 12, the inner peripheral surfaces of which will rotate in contact with the bearing layer 72 during the operation of the tire T in its flattened mode. This substantially prolongs the life of the liner 10, as compared to prior such devices in which the liner was designed to rotate directly in contact with the drop center of the tire rim.

Figure 4:
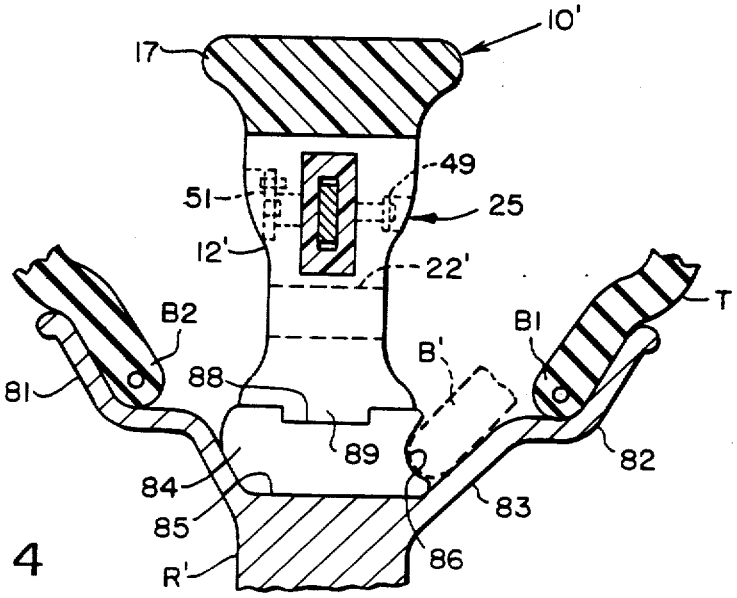
FIG. 4 is a fragmentary sectional view generally similar to that shown in FIG. 2, but illustrating a modified form of this safety ring.

Referring now to the embodiment shown in FIG. 4, wherein like numerals are employed to denote elements similar to those employed in the first embodiment, R′ denotes a conventional tire rim of the type which is normally used on most automobiles. This rim has at opposite sides thereof integral bead flanges 81 and 82, which are disposed to form seats for the beads B1 and B2 of a tire T in much the same manner as were the flanges 62 and 63 of the first embodiment. With this type of rim, however, the flange 82 is connected to the hub section of the rim by an inclined, circumferential ramp section 83, which is disposed to guide the bead B1 into a collapsed or broken line position as shown in FIG. 4, when the tire T is deflated and the bead has broken away from flange 82. This position of the bead B1 is similar to the position the bead assumes prior to inflation of the tire. As air pressure builds up in the tire during its assembly onto the rim R′, the bead B1 will slide or pop suddenly from its broken line to its full line position shown in FIG. 4 against flange 82.

Because of this need to accommodate the bead B1 in its broken line position, the liner 10′ of this embodiment cannot be employed with a bead lock ring of the type employed in the first embodiment. Instead the liner 10′ is mounted on a bead lock runner 84, which may be made from galvanized steel, or the like, and which, as in the case of ring 66, is generally C-shaped in configuration so that opposite ends thereof can be spread apart far enough to permit the runner to be positioned over the rim R′ and around the outside of its drop center 85. In this position a circumferential recess 86 in one side of the runner 84 (the right side thereof as shown in FIG. 4) is located in confronting relation to the inclined bead ramp 83, so that when bead B1 is in its collapsed position it is free to project into the recess 86.

The bottom of the runner 84 is configured to seat snugly into the recess in the rim R′ which defines its drop center 85, so that when the runner is in use it is held in a predetermined axial position on the rim R′ by the opposed side edges of the rim which project upwardly from the peripheral surface 85 formed by its drop center.

In its outer peripheral surface the runner 84 has therein a circumferential recess 88, which is generally rectangular in cross section, and which conforms to, and provides a seat for, circumferential flange sections 89 which project centrally from the inner peripheral surfaces of the two semi-circular sections of the liner 10′, only one of which sections is denoted at 12′ in FIG. 4. These two liner sections are otherwise similar to sections 11 and 12 in the first embodiment, except that instead of using reinforcing tubes 21 and 22, each section of the liner 10′ has therethrough a plurality of angularly spaced, transverse openings 22′, which reduce the overall weight and cost of the liner 10′.

The liner 10′ operates in a manner similar to that described above in connection [wit] *with* the liner 10. When the associated tire becomes flat and engages the outer periphery of liner 10′ the latter commences to rotate on the bead lock runner 84, during which rotation the liner is secured against axial movement relative to the rim R′ by virtue of the tongue and groove connection between the flange sections 89 on the liner, and the groove 88 in the runner 84. Moreover, in the event that the bead B1 should accidentally pop down into the recess 86 in runner 84 during the running of the tire in its flattened condition, this will not interfere with the continued rotation of the tire and [line] *liner* 10′.

When the bead B1 of the tire T is removed from flange 82 during the assembly of the tire onto, or its removal from, the rim R′, the liner 10′ can be assembled onto or removed from the runner 84 by manipulating the indexing plates 51 of its associated coupling mechanisms 25 in a manner which will be apparent from the above description of the first embodiment. It will also be apparent that the modified form of the liner 10′ and its associated runner 84 embody most of the advantages noted above in connection with the first embodiment. Furthermore, although only certain embodiments of the invention have been illustrated and described in detail herein, it will be apparent that this invention is capable of still further modification, and that this application is intended to cover any such modifications as may fall within the scope of one skilled in the art or the appended claims.

What I claim is:

[1. A safety liner for tires, comprising a pair of complimentary, semi-circular members made of a generally rigid, plastic material, a flexible, generally C-shaped bearing disposed to be secured around the drop center of a tire rim with the inner peripheral surface of the bearing engaged with the outer peripheral surface of the drop center of the rim, and means for releasably securing said semi-circular members together in the form of a ring disposed within a tire and coaxially around the outside of said bearing, and with the inner peripheral surfaces of said members being seated slidably in a circumferential groove formed in the outer surface of said bearing, the outer diameter of the ring formed by said members being greater than that of said rim and less than the inner periphery of a tire mounted on the rim, whereby when the last-named tire becomes flat it is engaged with the outer surfaces of said members to cause rotation of said members relative to said bearing, and said bearing having integral, circumferential flange sections at opposite side of said groove and slidably engageable with said members to prevent lateral movement thereof when said members are rotated on said bearing.]

2. [A safety liner for tires] *The combination* as defined in claim [1,] *14* wherein said securing means comprises a [pair] *plurality* of links extending between and connecting the confronting ends of [said] *adjacent* members [adjacent diametrally opposite sides] of the ring [formed thereby], means releasably mounting one end of each link in a recess in one [end] *of the two confronting ends* of [each member] *an adjacent pair of said members, and* means adjustably mounting the opposite end of each link in a registering recess formed in the *other* confronting end of [the other member] *said adjacent pair of members,* said adjustable means including manually operable means for shifting said opposite ends of said links into different positions of adjustment in said registering recesses, thereby selectively to shift toward and away from each other the confronting ends of the members connected thereby.

3. [A safety liner for tires] *The combination* as defined in claim 2, wherein said manually operable means includes

[a pair of eccentrics] *an eccentric* mounted in said *other confronting end of each pair of adjacent* members [adjacent the opposite ends thereof] for rotation manually into different positions of adjustment, and means connecting said eccentrics to said opposite ends of said links to shift the latter in response to the rotation of said eccentrics.

4. [A safety liner for tires] *The combination* as defined in claim 2, wherein said means for releasably mounting said one end of each link comprises a [pair of pins each of which is] *pin* releasably mounted in said [end] *one of said two confronting ends* of [a respective member] *an adjacent pair of members* to extend slidably through an opening in said one end of the associated link thereby to secure said one ends of said links for pivotal movement about axes which extend parallel to the axis of the ring formed by said members, said one ends of said links being removable from said recesses in said one *of said confronting* ends of said members upon removal of said pins, thereby to permit complete separation of said members.

5. [A safety liner for tires] *The combination* as defined in claim 4, wherein said manually operable means comprises a [pair of] circular [eccentrics] *eccentric* rotatably mounted[, respectively,] in said opposite [ends] *end* of [said links] *each link*, and means for manually rotating each of said eccentrics about an axis extending parallel to and laterally offset from its centerline.

6. [A safety liner for tires] *The combination* as defined in claim 5, wherein the last-named means comprises a [pair] *plurality* of indexing plates mounted to rotate in recesses formed in the sidewalls of said members, and connected to the eccentrics to impart rotation thereto, and means for releasably securing each of said plates in one of a plurality of different angular positions about its axis of rotation.

7. [A safety liner for tires] *The combination* as defined in claim [1,] *14* wherein said C-shaped bearing comprises a C-shaped band made of the same material as said members, and a C-shaped layer of bearing material, different from the first-named material, and secured to the outer periphery of said band and defining said circumferential groove in which said members are seated.

8. [A safety liner for tires] *The combination* as defined in claim [1,] *14* wherein said C-shaped bearing consists of a material different from the material from which said members are made.

9. [A safety liner for tires] *The combination* as defined in claim 8, wherein said bearing is made from galvanized steel and said members are made from a polyester elastomer.

10. [A safety liner for tires] *The combination* as defined in claim [1,] *14* wherein a plurality of arcuate reinforcing [members] *elements* made from a material different from said [elements] *members* are embedded in each of said members coaxially of the radius of curvature of the member.

[11. A safety ring for tires, comprising a plurality of rigid, arcuate members having a common radius of curvature, and disposed to be arranged in a ring coaxially about the drop center of a tire rim, and within a tire mounted on said rim, and means for releasably connecting together adjacent ends of said members to form said ring, including a plurality of links projecting from at least certain ends of said members, and disposed to be inserted into registering recesses in the adjacent ends of the other of said members, when the members are arranged in said ring, means in said registering recesses for releasably securing the projecting ends of said links to said other members, and means adjustably mounting the opposite ends of said links in said certain ends of said members and manually operable, when said projecting ends are secured to said other members, selectively to retract said links into said certain ends of said members and thereby to draw together the confronting ends of the members connected by said links.]

[12. A safety ring for tires as defined in claim 11, wherein said means for releasably securing said projecting ends comprises a plurality of pins each of which is releasably secured in one of said recesses and extends through an opening in said projecting end supporting it for movement about an axis extending parallel to axis of said ring.]

[13. A safety ring for tires as defined in claim 12, wherein said means for adjustably mounting the opposite ends of said links comprises an eccentric mounted in each of said other members and rotatable manually into different positions of adjustment, and means connecting said opposite ends of said links to said eccentrics for movement thereby in response to the rotation of said eccentrics.]

*14. In the combination of a tire rim having thereon a valve stem, a tire removably mounted on said rim, and a removable safety ring surrounding said rim within said tire, and wherein said ring comprises a plurality of arcuate members made of a generally rigid, plastic material, and having a common radius of curvature, and means for releasably securing said arcuate members together in said tire to form said ring, the improvement comprising*

*a one-piece, flexible generally C-shaped bearing releasably secured beneath said ring coaxially around and in engagement with the center section of said tire rim and with the opposite ends of said bearing being positioned in spaced, confronting relation, and with the space between said ends registering with an inner end of said valve stem, which projects from the outer peripheral surface of the rim,*

*said bearing having in its outer peripheral surface a circumferential groove, and the inner peripheral surface of said arcuate members being slidably seated in said groove,*

*the outer diameter of the ring formed by said members being greater than that of said rim and less than the inner periphery of the tire mounted on the rim, whereby when the tire becomes flat it is engaged with the outer surfaces of said members to cause rotation of said members relative to said bearing, and*

*said bearing having integral, circumferential flange sections at opposite sides of said groove and slidably engagable with said members to prevent lateral movement thereof when said members are rotated on said bearing.*

* * * * *